(12) United States Patent
Tsutsumi et al.

(10) Patent No.: US 6,341,591 B1
(45) Date of Patent: Jan. 29, 2002

(54) DIRECT FUEL INJECTION-TYPE SPARK IGNITION INTERNAL COMBUSTION ENGINE

(75) Inventors: Yasuhito Tsutsumi; Toyokazu Baika, both of Susono; Tatehito Ueda, Nagoya; Takeshi Okumura, Susono; Toshimi Kashiwagura, Susono; Mutsumi Kanda, Susono; Fumiaki Hattori, Mishima, all of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/449,766

(22) Filed: Nov. 26, 1999

(30) Foreign Application Priority Data

| Dec. 2, 1998 | (JP) | 10-342793 |
| Mar. 25, 1999 | (JP) | 11-081850 |
| Aug. 26, 1999 | (JP) | 11-239856 |

(51) Int. Cl.⁷ .......................... F02B 17/00; F02B 31/08; F02B 23/10
(52) U.S. Cl. ............. 123/295; 123/301; 123/302; 123/308
(58) Field of Search .............. 123/295, 301, 123/302, 308

(56) References Cited

U.S. PATENT DOCUMENTS

| 5,245,964 A | * | 9/1993 | Matsuo et al. ......... 123/308 X |
| 5,640,941 A | * | 6/1997 | Hazen et al. ................ 123/306 |
| 5,775,288 A |   | 7/1998 | Suzuki et al. ............... 123/298 |
| 5,799,638 A |   | 9/1998 | Tsuchida et al. ........... 123/302 |
| 5,970,948 A | * | 10/1999 | Yasuoka ................. 123/308 X |
| 6,006,718 A | * | 12/1999 | Ishihara et al. ......... 123/308 X |
| 6,035,823 A | * | 3/2000 | Koike et al. ................ 123/276 |

FOREIGN PATENT DOCUMENTS

| EP | 0875670 | 11/1998 |
| EP | 0875672 | 11/1998 |
| EP | 0879942 | 11/1998 |
| JP | 09-158736 | 6/1997 |
| JP | 10-110660 | 4/1998 |
| JP | 10-212965 | 8/1998 |
| JP | 10-252477 | 9/1998 |
| JP | A 10-252477 | 9/1998 |
| JP | 10-339144 | * 12/1998 |
| JP | 10-339151 | * 12/1998 |

* cited by examiner

*Primary Examiner*—Tony M. Argenbright
(74) *Attorney, Agent, or Firm*—Oliff & Berridge PLC

(57) ABSTRACT

In a direct fuel injection-type spark ignition internal combustion engine including a spark plug and a fuel injector for injecting fuel directly into the cylinder, the engine can carry out stratified charge combustion by the fuel injection in the compression stroke and uniform charge combustion by the fuel injection in the intake stroke. The engine includes a mechanism which can make a tumbling stream formed in the cylinder in the intake stroke in the stratified charge combustion weaker than that in the uniform charge combustion.

20 Claims, 10 Drawing Sheets

DIRECT FUEL INJECTION-TYPE SPARK IGNITION INTERNAL COMBUSTION ENGINE

BACKGROUND OF THE INVENTION

1. Field of the Invention

The present invention relates to a direct fuel injection-type spark ignition internal combustion engine.

2. Description of the Related Art

A direct fuel injection-type spark ignition internal combustion engine with a fuel injector for injecting fuel directly into cylinder forms a combustible mixture only in the vicinity of a spark plug at the ignition timing by injecting fuel in the latter half of the compression stroke to realize stratified charge combustion by which a lean mixture in the cylinder as a whole can be burned.

Thus, the stratified charge combustion is effective to reduce the fuel consumption. However, fuel injected in the compression stroke must be vaporized for a relatively short period until the ignition timing, and thus in high engine load operating conditions in which a large amount of fuel is required, a general direct fuel injection-type spark ignition internal combustion engine abandons stratified charge combustion and carries out uniform charge combustion in which a uniform charge mixture is formed in the cylinder at the ignition timing by injecting fuel in the intake stroke.

In a general spark ignition internal combustion engine including such a direct fuel injection-type spark ignition internal combustion engine, an intake port and an exhaust port are connected to the top portion of the cylinder. Therefore, when the intake valve is opened in the intake stroke, intake air is introduced from the whole circumference portion of opening of the intake port into the cylinder and thus a tumbling stream of intake air which generally turns in the cylinder is formed, which stream moves down along the exhaust port side of the cylinder bore and moves up along the intake port side thereof.

Such a vertical tumbling stream can be made strong or weak by changing a connecting direction of the intake port to the top portion of the cylinder or a configuration of the intake port. If the tumbling stream is made strong, in uniform charge combustion, fuel injected in the intake stroke is satisfactorily mixed with intake air by the tumbling stream and thus a good uniform charge mixture can be formed in the cylinder at the ignition timing. However, the strongly tumbling stream still turns when the piston moves up in the first half of the compression stroke, and does not disappear in the latter half of the compression stroke so that turbulence is produced in the cylinder. Therefore, in stratified charge combustion, a combustible mixture in the vicinity of the spark plug is broken up before the ignition timing and thus it becomes difficult to realize good stratified charge combustion. On the other hand, if the tumbling stream is made weak, the problem in which a combustible mixture is broken up in stratified charge combustion can be solved, but in uniform charge combustion, the injected fuel is not satisfactorily mixed with intake air by the tumbling stream and thus good uniform charge combustion cannot be realized.

Japanese Unexamined Patent Publication (Kokai) No. 10-252477 discloses a direct fuel injection-type spark ignition internal combustion engine in which, in stratified charge combustion, the fuel injector arranged on the intake valve side in the upper portion of the cylinder injects fuel into a cavity formed on the upper surface of the piston in the latter half of the compression stroke. In the internal combustion engine, a mask wall is formed on the opening of the intake port only at the side adjacent to the exhaust port and, in stratified charge combustion, a lifting amount of the intake valve is reduced by use of a variable lifting mechanism.

Therefore, in stratified charge combustion, intake air is introduced from the opening of the intake port only at the opposite side of the mask wall into the cylinder and thus another tumbling stream of intake air which generally turns in the cylinder is formed, which stream moves down along the intake port side of the cylinder bore and moves up along the exhaust port side thereof. This tumbling stream turns in reverse in comparison with the above-mentioned tumbling stream. Accordingly, in hereafter, this tumbling stream is defined as the reverse tumbling stream, and the above-mentioned tumbling stream is defined as the original tumbling stream.

Thus, the reverse tumbling stream formed in the cylinder in stratified charge combustion is relatively strong to be produced during the whole intake stroke. Therefore, the reverse tumbling stream still turns vertically in the cylinder in the compression stroke and enters into the cavity involving the moving up of the piston, and thereafter turns vertically in the cavity in the latter half of the compression stroke. The internal combustion engine of the above-mentioned prior art intends to lead fuel vaporized in the cavity to the vicinity of the spark plug by the reverse tumbling stream and to form a combustible mixture therein.

However, even if the relatively strong reverse tumbling stream leads fuel vaporized in the cavity to the vicinity of the spark plug, it also functions to break up the combustible mixture so that good stratified charge combustion cannot be realized. Thus, in stratified charge combustion, if a turbulence due to the original tumbling stream or the reverse tumbling stream is in the cylinder at least in the latter half of the compression stroke, a combustible mixture in the vicinity of the spark plug may be broken up and thus this is unfavorable in stratified charge combustion.

SUMMARY OF THE INVENTION

Therefore, an object of the present invention is to provide a direct fuel injection-type spark ignition internal combustion engine which carries out changes to stratified charge combustion and uniform charge combustion, and which can prevent a turbulence in the cylinder in the latter half of the compression stroke when stratified charge combustion is carried out and can form a good uniform charge mixture in the cylinder by satisfactory mixing in the intake stroke when uniform charge combustion is carried out.

According to the present invention, there is provided a first direct fuel injection-type spark ignition internal combustion engine comprising a spark plug and a fuel injector for injecting fuel directly into the cylinder, wherein the engine can carry out stratified charge combustion by the fuel injection in the compression stroke and uniform charge combustion by the fuel injection in the intake stroke, the engine comprising variable tumbling stream strength means which can make a tumbling stream formed in the cylinder in the intake stroke in said stratified charge combustion weaker than that in said uniform charge combustion.

According to the present invention, there is provided a second direct fuel injection-type spark ignition internal combustion engine comprising a spark plug and a fuel injector for injecting fuel directly into the cylinder, wherein the engine can carry out stratified charge combustion by the fuel injection in the compression stroke and uniform charge combustion by the fuel injection in the intake stroke, fuel is injected in the first stage of the intake stroke in the uniform charge combustion, the engine comprising flow producing means which can produce a strong flow in the cylinder only in the first stage of the intake stroke.

The present invention will be more fully understood from the description of preferred embodiments of the invention set forth below, together with the accompanying drawings.

DESCRIPTION OF THE PREFERRED EMBODIMENT

Figure 1:
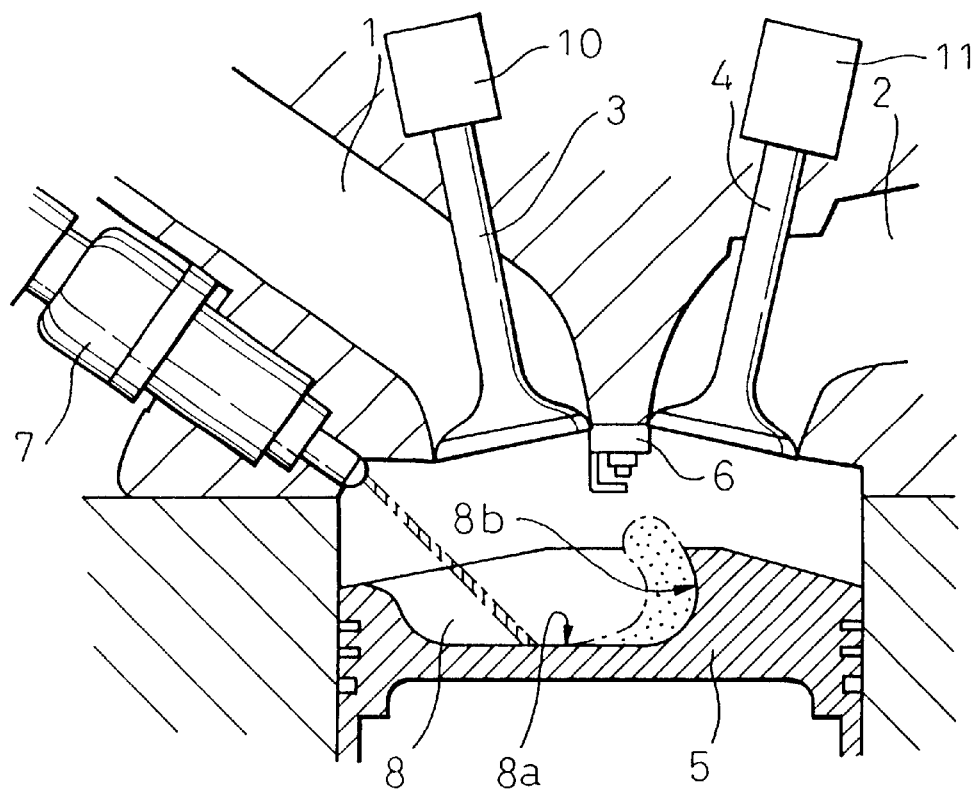
FIG. 1 is a vertical sectional view schematically illustrating a cylinder portion of direct fuel injection-type spark ignition internal combustion engine according to a first embodiment of the present invention.

FIG. 1 is a vertical sectional view schematically illustrating the cylinder portion of direct fuel injection-type spark-ignition internal combustion engine according to a first embodiment of the present invention. In FIG. 1, reference numeral 1 denotes an intake port and 2 denotes an exhaust port. The intake port 1 is communicated with the cylinder via an intake valve 3, and the exhaust port 2 is communicated with the cylinder via an exhaust valve 4. Reference numeral 5 denotes a piston, and 6 denotes a spark plug arranged on the center area of the upper portion of the cylinder. Reference numeral 7 denotes a fuel injector which injects fuel from the circumference area of the upper portion directly into the cylinder. The fuel injector 7 is arranged on the intake port side of which temperature is relatively low in the cylinder by intake air to prevent a fuel vaporization.

Figure 2:
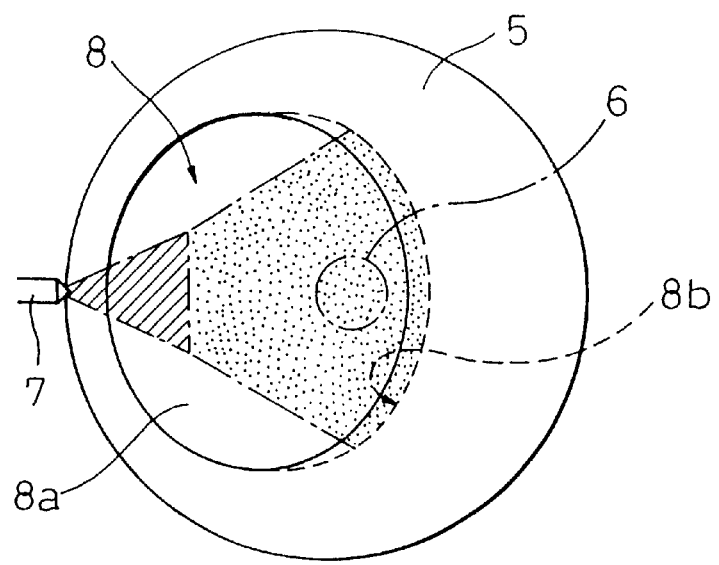
FIG. 2 is a plan view of the piston in the first embodiment.

FIG. 2 is a plan view of the piston 5. As shown FIGS. 1 and 2, a concave cavity 8 is formed on the upper surface of the piston 5. The cavity 8 is off-set toward the fuel injector side on the upper surface of the piston 5. The fuel injector 7 has a slit-like injection hole and injects fuel in the shape of a fan having a relative small thickness. To carry out a stratified charge combustion, as shown in FIGS. 1 and 2, fuel is injected into the cavity 8 formed on the upper surface of the piston 5 in the later half of the compression stroke. Fuel immediately after the injection shown by oblique lines is a liquid. However, fuel travels along the bottom wall 8a and vaporizes until it is directed to the vicinity of the spark plug 6 by the side wall 8b of the cavity 8 facing to the fuel injector. Therefore, at the ignition timing, the injected fuel becomes a combustible mixture having a good ignition ability shown by dots. Thus, the combustible mixture is formed only in the vicinity of the spark plug 6 and it is intended to carry out a stratified charge combustion which can burn a lean mixture in the cylinder as a whole.

The fuel spray of a fan shape having a relative small thickness travels along the bottom wall 8a of the cavity 8 while spreading in the width direction, and thus can favorably absorb heat from the wide area of the bottom wall 8a of the cavity 8. In the spreaded fuel in the width direction on the bottom wall 8a of the cavity 8, a central portion of fuel is given a speed component in the upper direction by the side wall 8b of the cavity 8 facing to the fuel injector and is directed to the vicinity of the spark plug 6. Both of side portions of fuel impinge to the side wall 8b of the cavity which has an arc shape in a plan view at an acute angle, and are given speed components of the upper direction and the central direction, and are directed to the vicinity of the spark plug 6. Thus, the fuel spray of a fan shape having a relative small thickness can form a combustible mixture in the vicinity of the spark plug 6, having a better degree of vaporization than that of a general fuel spray of a cone shape. It is therefore possible to increase an amount of fuel injected in the latter half of the compression stroke in order to carry out stratified charge combustion, and to expand the region of stratified charge combustion which has a low fuel consumption toward the high engine load side. However, in the present invention, such a fuel injector which realizes a fuel spray of a fan shape may not be used necessarily, and a fuel injector which realizes a fuel spray of a cone shape or which injects fuel in a column shape can be used.

Even if the fuel spray of a fan shape is used, when a large amount of fuel is required in high engine load operating conditions, it is difficult to inject the large amount of fuel only in the latter half of the compression stroke. Therefore, the large amount of fuel is injected in the intake stroke and uniform charge combustion is carried out.

To realize good stratified charge combustion, a combustible mixture must be maintained in the vicinity of the spark plug 6 at the ignition timing. In general, when the intake valve 3 is opened in the intake stroke, intake air is introduced from the whole circumference portion of opening of the intake port 1 into the cylinder and thus the tumbling stream of intake air which generally turns in the cylinder is formed, which stream moves down along the exhaust port side of the cylinder bore and moves up along the intake port side thereof. Such a vertical tumbling stream can be made strong or weak by changing a connecting direction of the intake port 1 to the top portion of the cylinder or a configuration of the intake port 1. If the original tumbling stream is always made strong, the strong tumbling stream is still maintained in the latter half of the compression stroke and produces a turbulence in the cylinder. Therefore, in stratified charge combustion, a combustible mixture in the vicinity of the spark plug 6 is broken up before the ignition timing and thus it becomes difficult to realize good stratified charge combustion. On the other hand, if the original tumbling stream is always made weak, in uniform charge combustion, the fuel injected in the intake stroke is not satisfactorily mixed with intake air by the weak tumbling stream and thus good uniform charge combustion cannot be realized.

Figure 3:
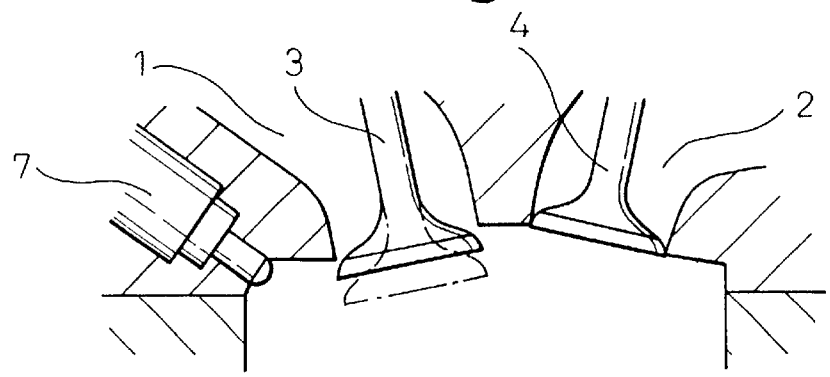
FIG. 3 is an explaining view of the intake valve motion in the first embodiment.

To solve these problems, in the present embodiment, electromagnetic or hydraulic-type actuators 10, 11 are used to actuate the intake valve 3 and the exhaust valve 4, instead of general cams. The actuators 10, 11 can change easily the working stroke thereof. In the present embodiment, the actuator 10 for the intake valve 3 can work in at least two positions, i.e., in a first working position in which a large lifting amount of the intake valve 3 is realized as shown by a chain line in FIG. 3, and in a second working position in which a small lifting amount of the intake valve 3 is realized as shown by a solid line in FIG. 3.

In the present embodiment, in uniform charge combustion, the actuator 10 opens the intake valve 3 with a large lifting amount in the first working position. A connecting direction of the intake port 1 to the top portion of the cylinder and a configuration of the intake port 1 are selected such that the strong original tumbling stream is formed in the cylinder at this time. Thus, in uniform charge combustion, fuel injected in the intake stroke is satisfactorily mixed with intake air by the strong original tumbling stream, and thus a good uniform charge mixture uniformized satisfactorily is formed in the cylinder at the ignition timing and good uniform charge combustion can be realized. As above-mentioned, the strong original tumbling stream is still maintained in the latter half of the compression stroke and produces a turbulence in the cylinder, and thus the turbulence makes the combustion speed increase in uniform charge combustion so that uniform charge combustion becomes better.

On the other hand, in stratified charge combustion, the actuator 10 opens the intake valve 3 with a small lifting amount in the second working position. Therefore, the amount of intake air falls considerably in the intake air introduction so that only the weak original tumbling stream is formed in the cylinder. Thus, the weak original tumbling stream disappears in at least the latter half of the compression stroke and no turbulence is produced in the latter half of the compression stroke. Therefore, a combustible mixture formed in the vicinity of the spark plug 6 is not broken up before the ignition timing and thus good stratified charge combustion can be realized.

Figure 4:
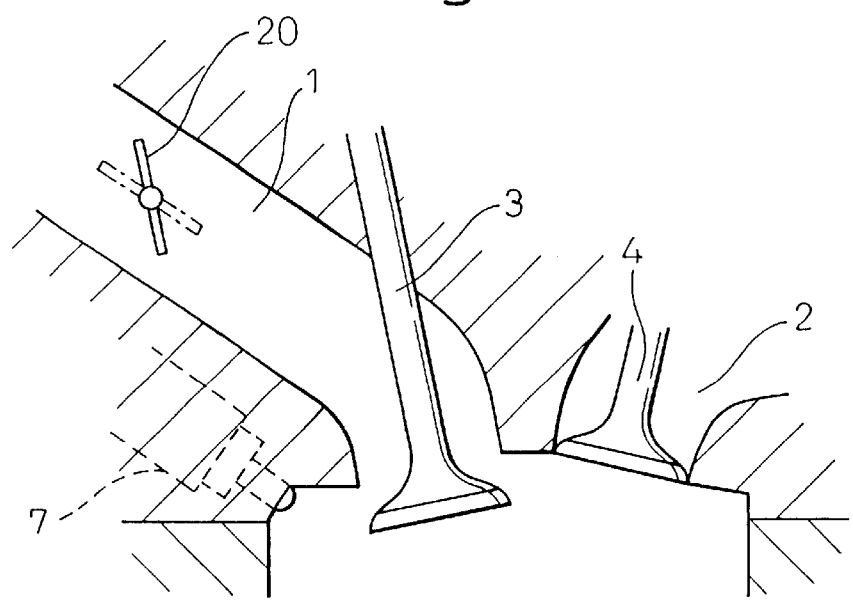
FIG. 4 is a vertical sectional view schematically illustrating a cylinder portion of direct fuel injection-type spark ignition internal combustion engine according to a second embodiment of the present invention.

FIG. 4 is a vertical sectional view schematically illustrating the cylinder portion of direct fuel injection-type spark-ignition internal combustion engine according to a second embodiment of the present invention. In FIG. 4, identical reference numerals with those in the first embodiment denote identical elements with those in the first embodiment. In the present embodiment, an intake air control valve 20 is arranged in the intake port 1.

In the present embodiment, in uniform charge combustion, the intake air control valve 20 is opened fully as shown by a chain line. The connecting direction of the intake port 1 to the top portion of the cylinder and the configuration of the intake port 1 are selected such that the strong original tumbling stream is formed in the cylinder at this time. Thus, in uniform charge combustion, fuel injected in the intake stroke is satisfactorily mixed with intake air by the strong original tumbling stream, and thus a good uniform charge mixture uniformized satisfactorily is formed in the cylinder at the ignition timing and good uniform charge combustion can be realized. As above-mentioned, the strong original tumbling stream is still maintained in the latter half of the compression stroke and produces a turbulence in the cylinder, and thus the turbulence makes the combustion speed increase in uniform charge combustion so that uniform charge combustion becomes better.

On the other hand, in stratified charge combustion, an open degree of the intake air control valve 20 is made smaller than that in stratified charge combustion as shown by a solid line. Therefore, the amount of intake air falls considerably in the intake air introduction so that only the weak original tumbling stream is formed in the cylinder. Thus, the weak original tumbling stream disappears in at least the latter half of the compression stroke and no turbulence is produced in the latter half of the compression stroke. Therefore, a combustible mixture formed in the vicinity of the spark plug 6 is not broken up before the ignition timing and thus good stratified charge combustion can be realized.

Figure 5:
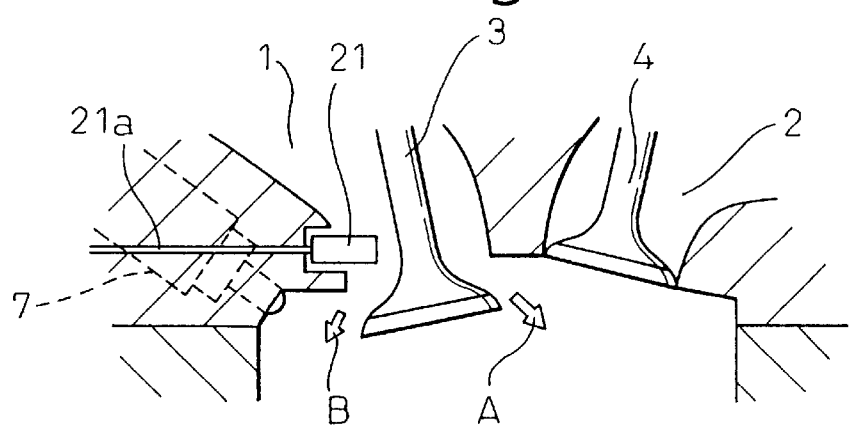
FIG. 5 is a vertical sectional view schematically illustrating a cylinder portion of direct fuel injection-type spark ignition internal combustion engine according to a third embodiment of the present invention.
Figure 6A:
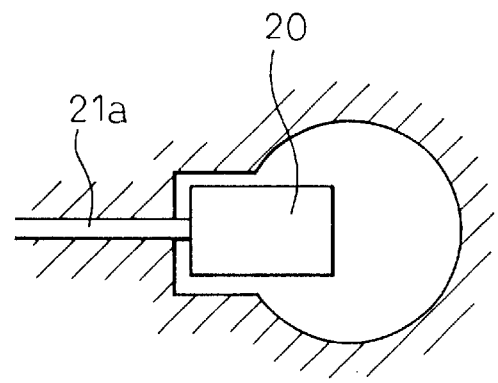
FIG. 6A is a transverse sectional view of the intake port according to the third embodiment, in which the deflection plate is in a first position.
Figure 6B:
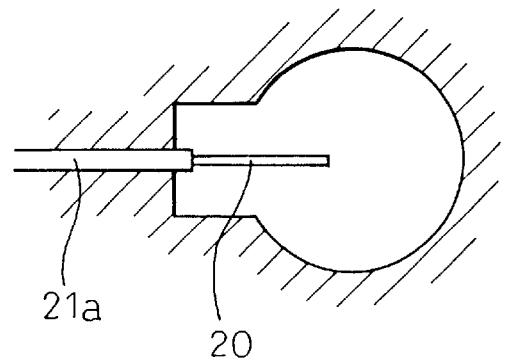
FIG. 6B is a transverse sectional view of the intake port according to the third embodiment, in which the deflection plate is in a second position.

FIG. 5 is a vertical sectional view schematically illustrating the cylinder portion of direct fuel injection-type spark-ignition internal combustion engine according to a third embodiment of the present invention. In FIG. 5, reference numerals identical to those in the first embodiment denote elements identical to those in the first embodiment. In the present embodiment, a movable deflection plate 21 is arranged in the intake port 1 at the opposite side to the exhaust port 2 in the vicinity of the opening of the intake port 1. The movable deflection plate 21 projects into the intake port 1 and can pivot with an operating rod 21a. The moveable deflection plate 21 can be operated in at least two positions, i.e., in a first position in which the surface area facing intake air thereof is made large such that intake air passing through the intake port 1 is deflected toward the adjacent side to the exhaust port 2 as shown in FIG. 6(A) which is a transverse sectional view of the vicinity of the opening of the intake port 1, and in a second position in which the surface area facing intake air thereof is made small such that intake air passing through the intake port 1 is not deflected toward the adjacent side to the exhaust port 2 as shown in FIG. 6(B) similar to FIG. 6(A). To actuate the movable deflection plate 21, a negative pressure actuator which utilizes negative pressure of intake air downstream of the throttle valve or a step motor can be used.

In the present embodiment, in stratified charge combustion, the movable deflection plate 21 is put in the second position as shown in FIG. 6(B). The connecting direction of the intake port 1 to the top portion of the cylinder and the configuration of the intake port 1 are selected such that the weak original tumbling stream is formed in the cylinder at this time. Thus, the weak original tumbling stream disappears in at least the latter half of the compression stroke and no turbulence is produced in the latter half of the compression stroke. Therefore, a combustible mixture formed in the vicinity of the spark plug 6 is not broken up before the ignition timing and thus good stratified charge combustion can be realized.

In this stratified charge combustion, intake air passing through the intake port 1 is not deflected toward the adjacent side to the exhaust port 2 and is introduced into the cylinder via the whole circumference Portion of opening of the intake port 1. At this time, all the intake air does not function to form the original tumbling stream which moves down along the exhaust port side of the cylinder bore and moves up along the intake port side thereof. As shown by an arrow in FIG. 5, a part (B) of intake air functions to form the reverse tumbling stream which moves down along the intake port side of the cylinder bore and moves up along the exhaust port side thereof. However, a main part (A) of intake air forms the original tumbling stream in the cylinder and in result, the original tumbling stream is formed in the cylinder.

On the other hand, in uniform charge combustion, the movable deflection plate 21 is made in the first position as shown in FIG. 6(A). Therefore, intake air passing through the intake port 1 is introduced into the cylinder to deflect toward the side adjacent to the exhaust port. In result, all intake air functions as the above-mentioned main part (A) of intake air and forms the original tumbling stream in the cylinder. Thus, this original tumbling stream is stronger than that in stratified charge combustion. Fuel injected in the intake stroke is satisfactorily mixed with intake air by the strong original tumbling stream, and thus a good uniform charge mixture uniformized satisfactorily is formed in the cylinder at the ignition timing and good uniform charge combustion can be realized. As above-mentioned, the strong original tumbling stream is still maintained in the latter half of the compression stroke and produces a turbulence in the cylinder, and thus the turbulence makes the combustion speed increase in uniform charge combustion so that uniform charge combustion becomes better. In the present embodiment, the movable deflection plate 21 pivots to deflect intake air as mentioned above. However, the movable deflection plate may reciprocate to deflect intake air as mentioned above.

Figure 7:
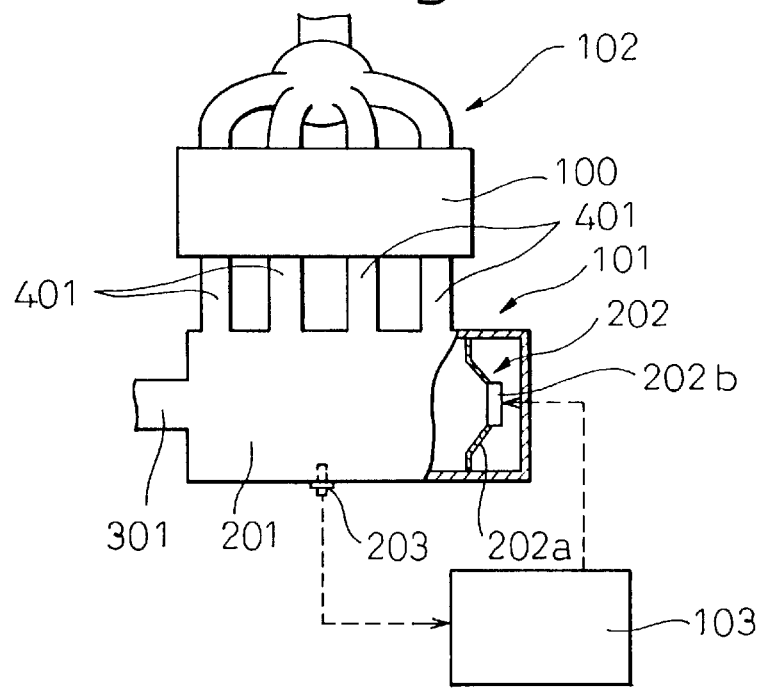
FIG. 7 is a general construction view schematically illustrating a direct fuel injection-type spark ignition internal combustion engine according to a fourth embodiment of the present invention.

FIG. 7 is a general construction view schematically illustrating a direct fuel injection-type spark-ignition internal combustion engine according to a fourth embodiment of the present invention. In FIG. 7, reference numeral 100 denotes an engine body having four cylinders which are internal construction as mentioned above. Reference numeral 101 is an intake system and 102 denotes an exhaust system. The exhaust system 102 releases exhaust gas discharged from each cylinder to the atmosphere via the merging portion. On the other hand, the intake system 101 has a surge tank 201, an intake passage 301 upstream of the surge tank 201, and intake ports 401 communicating the surge tank 201 with the cylinders.

Figure 8:
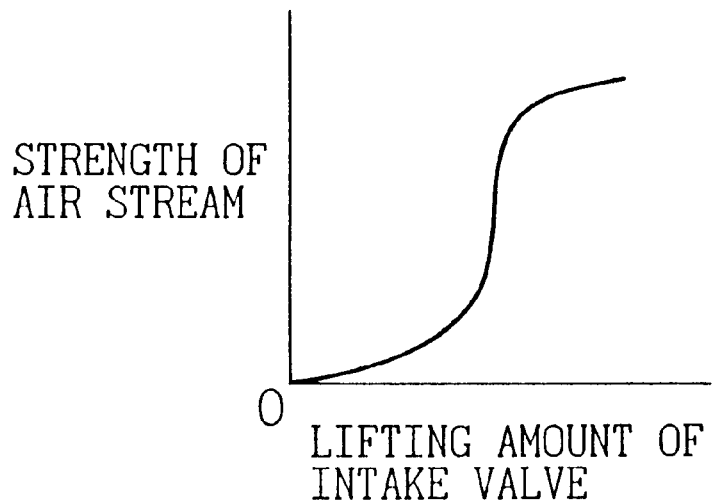
FIG. 8 is a graph showing a relationship between a lifting amount of the intake valve and a strong degree of air flow produced in the cylinder.

A speaker 202 is arranged in the surge tank 201 to increase and decrease an intake air pressure therein. The speaker 202 has a vibration plate 202a, formed of metal or the like, having a relative high strength, and a vibrator 202b for vibration plate 202a. Reference numeral 103 is a control device for supplying a vibration signal to the speaker 202. A pressure sensor 203 for detecting an intake air pressure in the surge tank 201 is connected to the control device 103. FIG. 8 is a graph showing a relationship between a lifting amount of the intake valve and a strong degree of air flow produced in the cylinder. As shown in the graph, it is understood that the larger a lifting amount of the intake valve becomes, the stronger an air flow becomes.

In the present embodiment, in stratified charge combustion, at least in the latter half of the intake valve lifting in which a lifting amount of the intake valve becomes large, the volume of the surge tank 201 is made large by the speaker 202 so that an intake air pressure in the surge tank 201 decreases. Therefore, an air flow produced in the cylinder in the latter half of the intake valve lifting is made weak so that a weak tumbling stream is formed in the cylinder. Thus, the weak tumbling stream disappears in at least the latter half of the compression stroke and no turbulence is produced in the latter half of the compression stroke. Therefore, a combustible mixture formed in the vicinity of the spark plug 6 is not broken up before the ignition timing and thus good stratified charge combustion can be realized.

In the case that each cylinder is provided with a volume portion as a surge tank and intake air pressure changing means as a speaker is arranged in each volume portion, in the whole intake stroke of each cylinder, the volume of the corresponding volume portion is made large by the corresponding speaker so that a tumbling stream produced in the cylinder can be made weaker. In this case, to increase the volume of each volume portion in the next intake stroke of each cylinder, the volume of each volume portion may be returned to the original volume by the corresponding speaker till the next intake stroke of the corresponding cylinder. However, as the present embodiment, in the case that the intake air pressure changing means is arranged in the surge tank 201 which is the common volume portion of all cylinders, to increase the volume of the surge tank for the cylinder having the following intake stroke, the volume of the surge tank 201 must be returned to the original volume by the speaker immediately before or after the end of the intake stroke. Thus, in the present embodiment, in the intake stroke of each cylinder, an intake air pressure in the surge tank 201 is made low only in the latter half of the intake valve lifting.

Figure 9:
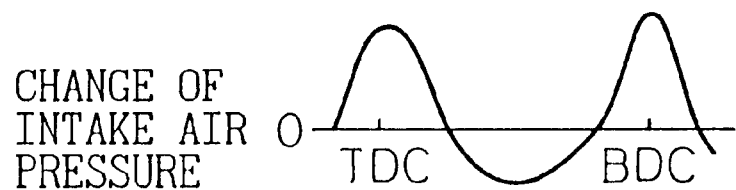
FIG. 9 is a graph showing a relationship in stratified charge combustion between a crank angle and an intake air pressure in the surge tank.

When an intake air pressure is made low, an amount of intake air introduced into the cylinder decreases. To prevent this, as shown in FIG. 9, in the first half of the intake valve lifting in which a strong air flow is hardly produced in the cylinder, the volume of the surge tank 201 may be inversely made small so that an intake air pressure increases.

On the other hand, in uniform charge combustion, at least in the latter half of the intake valve lifting in which a lifting amount of the intake valve becomes large, the volume of the surge tank 201 is inversely made small by the speaker 202 so that an intake air pressure in the surge tank 201 increases. Therefore, an air flow produced in the cylinder in the latter half of the intake valve lifting is made strong so that a strong tumbling stream is formed in the cylinder. Thus, fuel injected in the intake stroke is satisfactorily mixed with intake air by the strong tumbling stream, and thus a good uniform charge mixture uniformized satisfactorily is formed in the cylinder at the ignition timing and good uniform charge combustion can be realized. As above-mentioned, the strong tumbling stream is still maintained in the latter half of the compression stroke and produces a turbulence in the cylinder, and thus the turbulence makes the combustion speed increase in uniform charge combustion so that uniform charge combustion becomes better.

Figure 10:
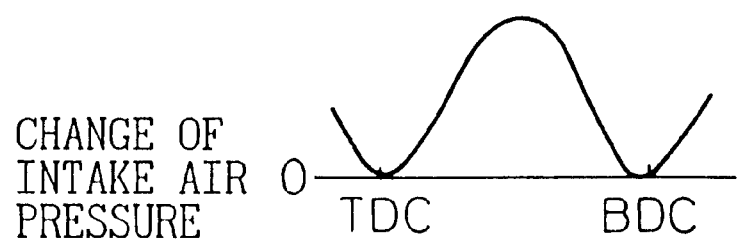
FIG. 10 is a graph showing a relationship in uniform charge combustion between a crank angle and an intake air pressure in the surge tank.

As explained in stratified charge combustion, in the case that each cylinder is provided with a volume portion as a surge tank and intake air pressure changing means as a speaker is arranged in each volume portion, in the whole intake stroke of each cylinder, the volume of the corresponding volume portion is made small by the corresponding speaker so that a tumbling stream produced in the cylinder can be made stronger. In this case, to decrease the volume of each volume portion in the next intake stroke of each cylinder, the volume of each volume portion may be returned to the original volume by the corresponding speaker till the next intake stroke of the corresponding cylinder. However, as the present embodiment, in the case that the intake air pressure changing means is arranged in the surge tank 201 which is the common volume portion of all cylinders, to increase the volume of the surge tank for the cylinder having the following intake stroke, the volume of the surge tank 201 must be returned to the original volume by the speaker immediately before or after the end of the intake stroke. Thus, in the present embodiment, as shown in FIG. 10, in the intake stroke of each cylinder, an intake air pressure in the surge tank 201 is made high only in the latter half of the intake valve lifting.

Figure 11:
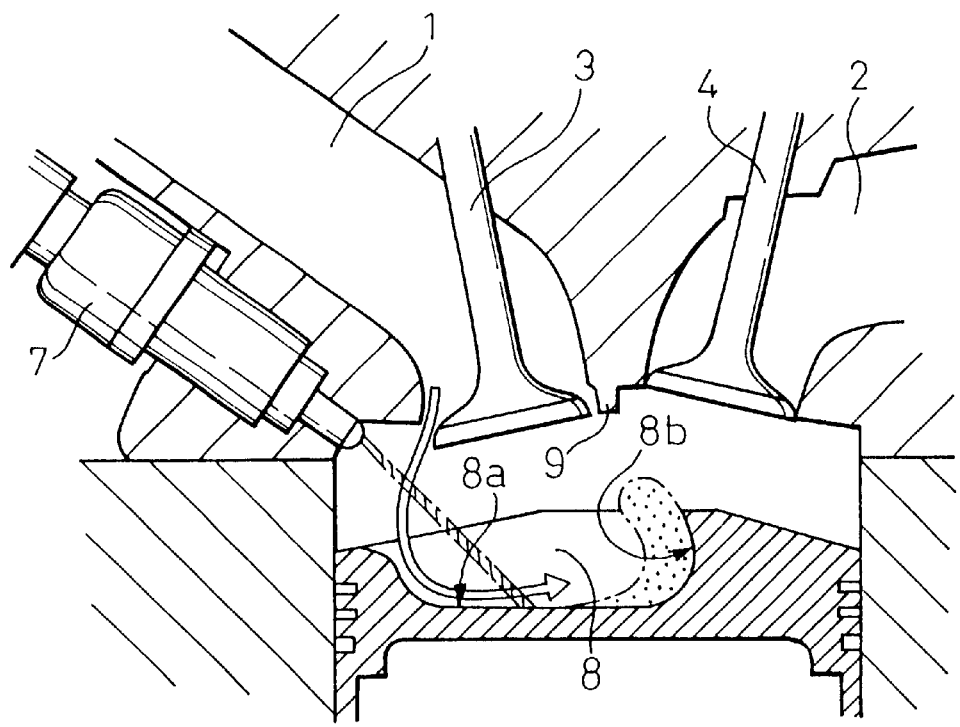
FIG. 11 is a vertical sectional view schematically illustrating a cylinder portion of direct fuel injection-type spark ignition internal combustion engine according to a fifth embodiment of the present invention.
Figure 12:
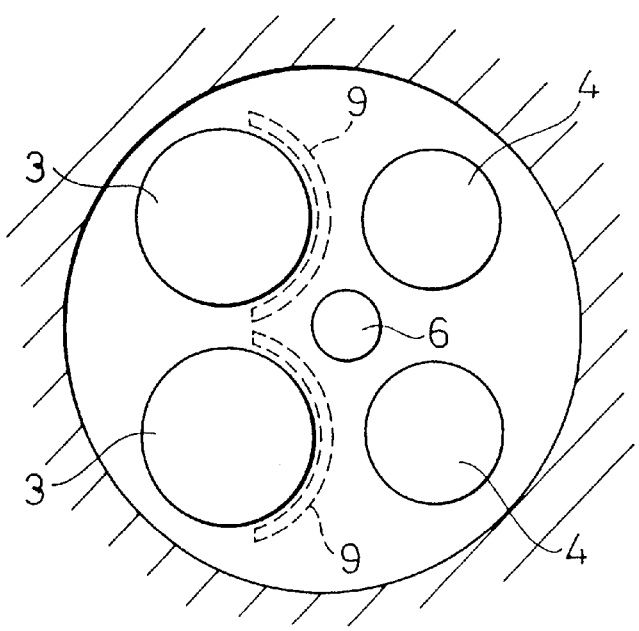
FIG. 12 is a plan view illustrating a top portion of the cylinder according to the fifth embodiment.

FIG. 11 is a vertical sectional view schematically illustrating the cylinder portion of direct fuel injection-type spark-ignition internal combustion engine according to a fifth embodiment of the present invention. FIG. 12 is plan view schematically illustrating the upper portion of the cylinder in the fifth embodiment. In FIGS. 11 and 12, reference numerals identical to those in the first embodiment denote elements identical to those in the first embodiment. In the present embodiment, the intake valve 3 and the exhaust valve 4 are actuated by cams as in a general internal combustion engine and a large lifting amount of the intake valve 3 is realized. A mask wall 9 projecting downward is formed on the opening of the intake port only at the adjacent side to the exhaust port in the cylinder head. As shown in FIG. 11, only in the first stage of the intake valve opening, i.e., of the intake stroke, is the intake valve 1 partly surrounded by the mask wall 9.

If such a mask wall is not formed, intake air is introduced via the whole circumference portion of opening of the intake port 1 when the intake valve 3 opens. As mentioned above, in this case, all the intake air does not function to form the original tumbling stream, and a part of intake air functions to form the reverse tumbling stream, and a main part of intake air functions to form the original tumbling stream. In result, the original tumbling stream is formed in the cylinder.

In the present embodiment, in the first stage of the intake valve opening, only an air flow to form the reverse tumbling stream is produced by the mask wall 9 as shown by an arrow in FIG. 11. Thus, the reverse tumbling stream is formed in the cylinder by all intake air in the first stage of the intake valve opening and thus it becomes relative strong. However, when the intake valve 1 opens beyond the mask wall 9, an air stream to form the original tumbling stream is further produced and in result, the original tumbling stream is formed in the cylinder. Therefore, the reverse tumbling stream formed in the first stage of the intake valve opening impinges to the original tumbling stream. Thus, both of the reverse tumbling stream and the original tumbling stream are dumped and disappear in at least the latter half of the compression stroke. Accordingly, no turbulence is produced in the latter half of the compression stroke. Therefore, a combustible mixture formed in the vicinity of the spark plug 6 is not broken up before the ignition timing and thus good stratified charge combustion can be realized.

On the other hand, in uniform charge combustion, fuel is injected at the first stage of the intake stroke. Therefore, the fuel is satisfactorily mixed with intake air by the strong reverse tumbling stream, and thus a good uniform charge mixture uniformized satisfactorily is formed in the cylinder at the ignition timing and good uniform charge combustion can be realized.

In uniform charge combustion, if the fuel injection is started from the first stage of the intake stroke, a part of fuel enters into the cavity 8 formed on the upper surface of the piston as in stratified charge combustion and may be reserved as a liquid fuel in the area between the bottom wall 8a and the side wall 8b facing to the fuel injector of the cavity 8. The liquid fuel does not vaporize till the ignition timing and causes smoke generation. In the present embodiment, the reverse tumbling stream produced by the mask wall 9 in the first stage of the intake stroke is introduced into the cavity 8 as shown in FIG. 11 and functions the liquid fuel in the cavity 8 to be discharge therefrom. Therefore, according to the present embodiment, smoke generation can be surely prevented.

Figure 13:
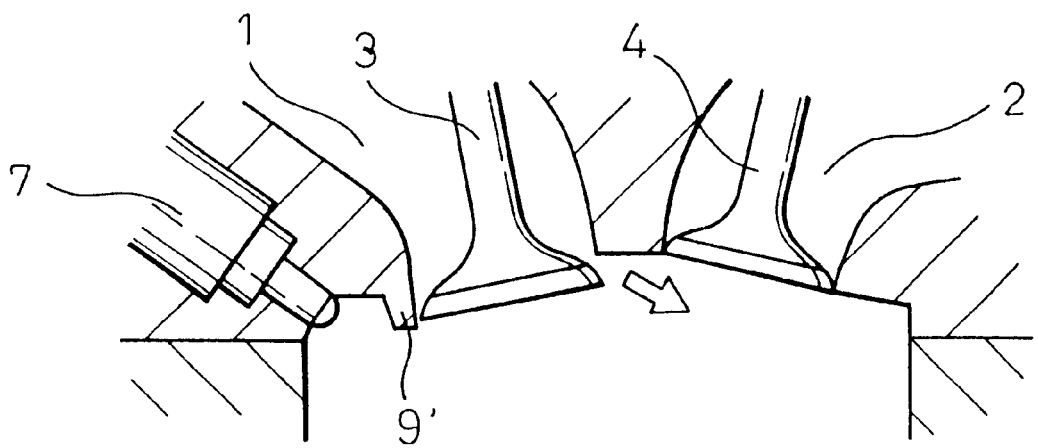
FIG. 13 is a vertical sectional view schematically illustrating a cylinder portion of direct fuel injection-type spark ignition internal combustion engine according to a sixth embodiment of the present invention.
Figure 14:
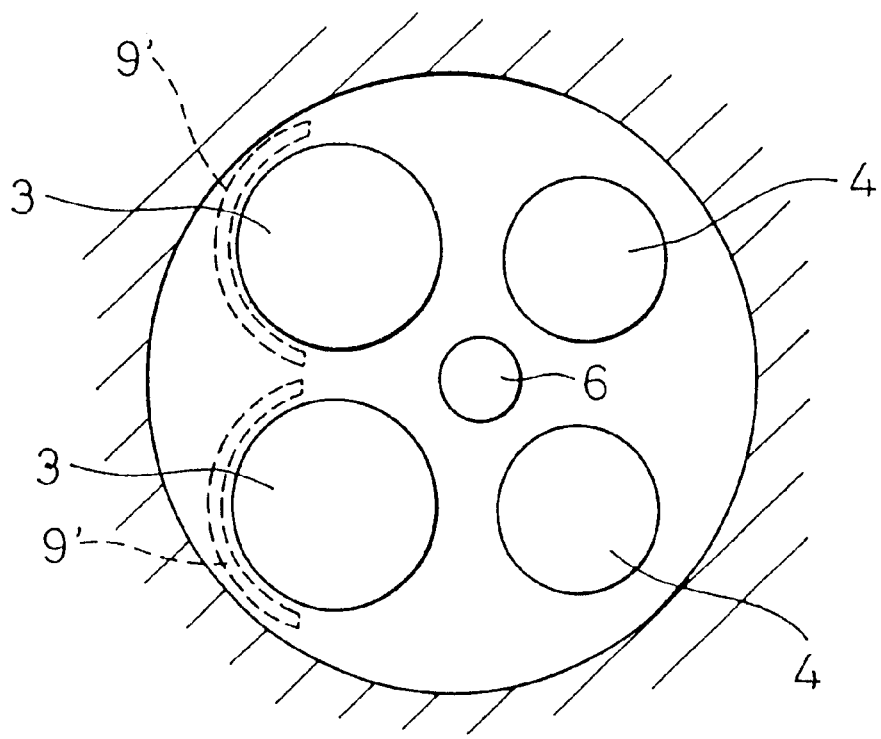
FIG. 14 is a plan view illustrating a top portion of the cylinder according to the sixth embodiment.

FIG. 13 is a vertical sectional view schematically illustrating the cylinder portion of direct fuel injection-type spark-ignition internal combustion engine according to a sixth embodiment of the present invention. FIG. 14 is a plan view schematically illustrating the upper portion of the cylinder in the sixth embodiment. The only differences between the sixth embodiment and the fifth embodiment are explained as follows. In the present embodiment, a mask wall 9' projecting downward is formed on the opening of the intake port only at the opposite side to the exhaust port in the cylinder head. As shown in FIG. 13, only in the first stage of the intake valve opening, i.e., of the intake stroke, is the intake valve 1 partly surrounded by the mask wall 9'.

In the present embodiment, when the intake valve 3 fully opens, intake air is introduced via the whole circumference of opening of the intake port 1 and as above-mentioned, a part of intake air functions to form the reverse tumbling stream, and a main part of intake air functions to form the original tumbling stream and, as a result, the original tumbling stream is formed in the cylinder. In the present embodiment, a connecting direction of the intake port 1 to the top portion of the cylinder and a configuration of the intake port 1 are selected such that the weak original tumbling stream is formed in the cylinder at this time. Thus, the weak original tumbling stream disappears in at least the latter half of the compression stroke.

On the other hand, in the first stage of the intake valve opening, the original tumbling stream is formed by all the intake air as shown by an arrow in FIG. 13 so that the original tumbling stream becomes relative strong. Thus, in the first stage of the intake stroke, the relative strong original tumbling stream is formed, but the original tumbling stream can disappear for a relative long period till the latter half of the compression stroke. Therefore, no turbulence is produced in the latter half of the compression stroke, and a combustible mixture formed in the vicinity of the spark plug 6 is not broken up before the ignition timing, and thus good stratified charge combustion can be realized.

In uniform charge combustion, fuel is injected at the first stage of the intake stroke. Therefore, the fuel is satisfactorily mixed with intake air by the strong original tumbling stream, and thus a good uniform charge mixture uniformized satisfactorily is formed in the cylinder at the ignition timing and good uniform charge combustion can be realized.

Figure 15:
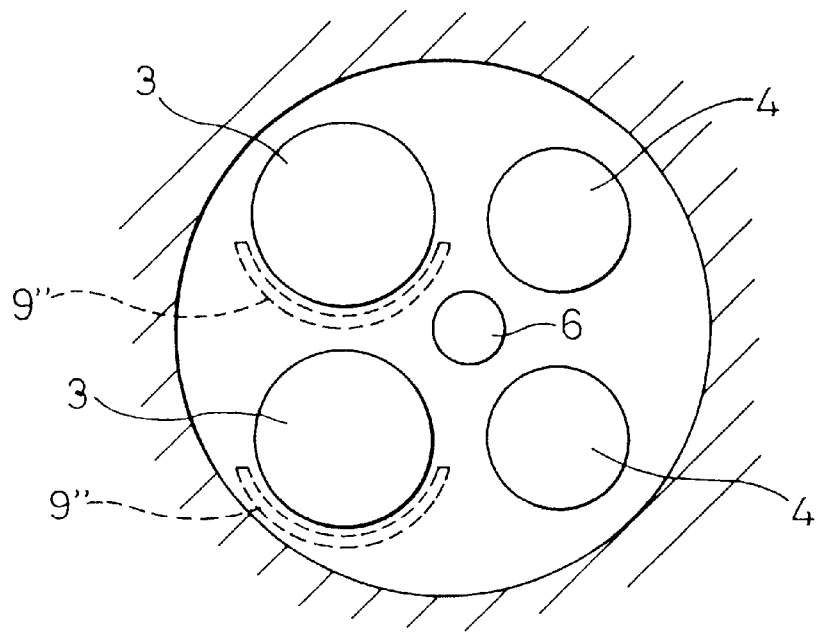
FIG. 15 is a plan view illustrating a top portion of the cylinder of direct fuel injection-type spark ignition internal combustion engine according to a seventh embodiment of the present invention.

FIG. 15 is a plan view schematically illustrating the upper portion of the cylinder in the seventh embodiment, corresponding to FIGS. 12 and 14. In the present embodiment, a mask wall 9" is formed to surround the opening of the intake port at each half of the adjacent side and the opposite side to the exhaust port in the cylinder head. Accordingly, in the first stage of the intake valve opening, another strong tumbling stream which turns in the cylinder nearly at right angles to the original tumbling stream is formed and thereafter the weak original tumbling stream is formed. Thus, similar to the sixth embodiment, these tumbling streams disappear till the latter half of the compression stroke. Therefore, no turbulence is produced in the latter half of the compression stroke, and a combustible mixture formed in the vicinity of the spark plug 6 is not broken up before the ignition timing, and thus good stratified charge combustion can be realized. On the other hand, in uniform charge combustion, fuel is injected at the first stage of the intake stroke. Therefore, the fuel is satisfactorily mixed with intake air by another strong tumbling stream at the first stage of the intake stroke, and thus good uniform charge combustion can be realized. In case that two intake ports are provided as the present embodiment, two mask walls 9" are favorably arranged in the same direction to maintain the strong tumbling stream formed in the first stage of the intake stroke by the mask walls 9" without impinging each other.

As the fifth, sixth, and seventh embodiments, if a mask wall is partly formed on the opening of the intake port, a strong air flow in the cylinder is produced only in the first stage of the intake stroke. At this time, fuel is injected so that a good uniform charge combustion can be realized. The strong air flow can disappear for a relative long period till the latter half of the compression stroke and thus, it does not have a bad influence for stratified charge combustion.

Figure 16:
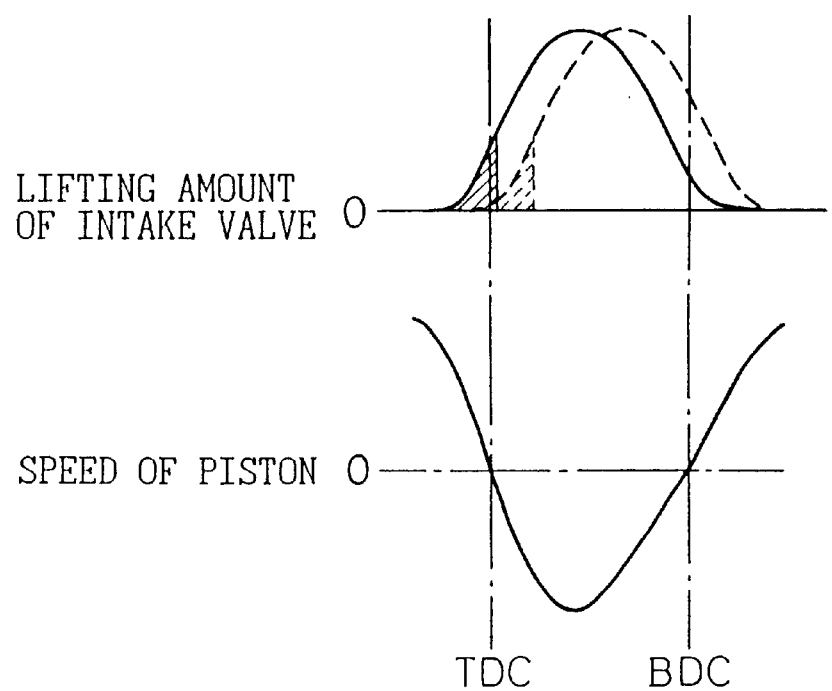
FIG. 16 shows graphs of relationships between a crank angle and a lifting amount of the intake valve, and between a crank angle and a speed of the piston.

FIG. 16 shows graphs of relationships between a crankangle and a lifting amount of the intake valve 3, and between a crank-angle and a speed of the piston. The intake valve 3 generally starts to open before a top dead center (TDC), i.e., during the piston moves up, by a valve-overlap, as shown by a solid line. In the fifth, sixth, and seventh embodiments, when uniform charge combustion is carried out in high engine load operating conditions, as above-mentioned, fuel is injected at the first stage of the intake valve opening, i.e., at the first stage of the intake stroke and thus fuel is sufficiently mixed with air by a strong air flow produced in the cylinder at this time. However, as shown by a dotted line in FIG. 16, in uniform charge combustion, if an open timing of the intake valve 3 is retarded by using of a variable valve timing mechanism, the first stage of the intake valve opening (shown by oblique lines), i.e., a period in which a part of the intake valve 3 is surrounded by the mask wall 9, 9', 9", can be made during the piston moves down and thus an air flow produced in the cylinder at this time can be made stronger. Therefore, in uniform charge combustion in the fifth, sixth, and seventh embodiments, the injected fuel is mixed with air more sufficiently, and thus a better uniform charge mixture, uniformized satisfactorily, is formed in the cylinder at the ignition timing and better uniform charge combustion can be realized.

Figure 17:
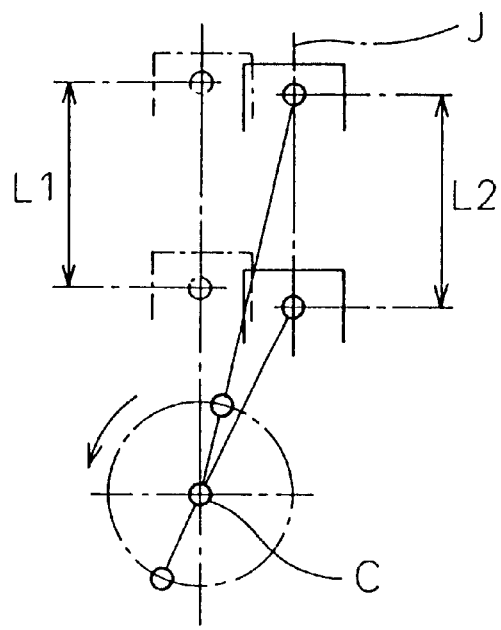
FIG. 17 is an explaining view of an off-set crank mechanism.

FIG. 17 is a view explaining an off-set crank mechanism. As shown in FIG. 17, an axis (J) of the piston is off-set from a center (C) of the crank-shaft.

Therefore, a piston stroke (L2) becomes larger than a piston stroke (L1) shown by a chain line in case that an axis of the piston corresponds to a center of the crankshaft, and a range of the crank angles between a top dead center and a bottom dead center does not become 180 degrees. Accordingly, as shown by an arrow in FIG. 17, if a rotating direction of the crank-shaft is suitably selected, a speed of the piston moving up becomes slower than that in the normal arrangement shown by the chain line but a speed of the piston moving down can be made higher than that in the normal arrangement. By using of such an off-set crank mechanism, in uniform charge combustion in the fifth, sixth, and seventh embodiments, a stronger air flow can be produced in the cylinder in the first stage of the intake valve opening. Thus, fuel injected at this time is mixed with air more sufficiently, and thus a better uniform charge mixture, uniformized satisfactorily, is formed in the cylinder at the ignition timing and better uniform charge combustion can be realized. Of course, in the fifth, sixth, and seventh embodiments, both of this off-set crank mechanism and the above-mentioned retarded open timing of the intake valve can be adopted.

Figure 18:
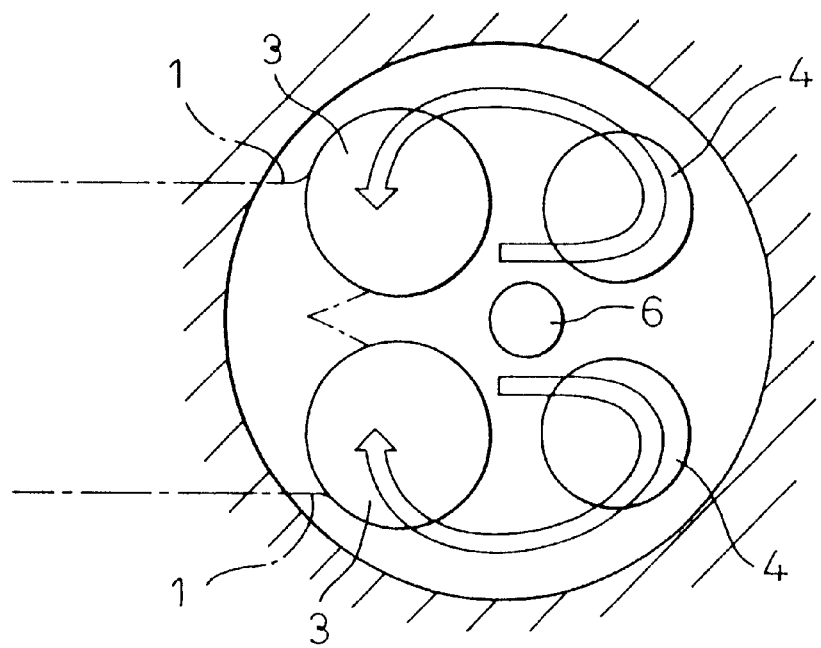
FIG. 18 is a plan view illustrating a top portion of the cylinder of direct fuel injection-type spark ignition internal combustion engine according to an eighth embodiment of the present invention.

FIG. 18 is a plan view illustrating a top portion of the cylinder of direct fuel injection-type spark ignition internal combustion engine according to an eighth embodiment of the present invention. In FIG. 18, reference numerals identical to those in the first embodiment denote elements identical to those in the first embodiment. In the present embodiment, two intake ports 1 are helical ports in which an immediately upstream portion of the intake valve 3 has a helical shape to give a swirl force to intake air. In particular, the two intake ports 1 give swirl forces in the reverse directions with each other. Therefore, each intake air introduced into the cylinder in each intake valve opening is intended to form the tumbling stream, and at same time, is intended to turn transversely in the outer direction as shown by an arrow in FIG. 18, and in result, turns obliquely in the cylinder.

Thus, the two air flows produce strong turbulence in the cylinder at the first stage of the intake stroke. Therefore, in uniform charge combustion, the fuel injected at this time is satisfactorily mixed with intake air by the strong turbulence, and thus a good uniform charge mixture, uniformized satisfactorily, is formed in the cylinder at the ignition timing and good uniform charge combustion can be realized. These two air flows impinge on each other and are dumped in the latter half of the intake stroke and thus disappear in at least the latter half of the compression stroke. Accordingly, no turbulence is produced in the latter half of the compression stroke. Therefore, a combustible mixture formed in the vicinity of the spark plug 6 is not broken up before the ignition timing and thus good stratified charge combustion can be realized.

In the present embodiment, each intake port 1 gives a swirl force in the outer direction to intake air. However, of course, each intake port 1 may give a swirl force in the inner direction to intake air. By using of such an arrangement, two air flows formed in the cylinder in the intake valves opening also turn obliquely and produce strong turbulence in the cylinder at the first stage of the intake stroke. However, these two air flows impinge on each other and immediately thereafter are dumped and thus disappear in at least the latter half of the compression stroke. Accordingly, good uniform charge combustion and good stratified charge combustion can be realized.

In the present embodiment, the two intake ports 1 do not have a partition wall therebetween except in the immediately upstream portions of the intake valves 3 to produce the swirl forces, as shown by a chain line in FIG. 18. Therefore, the two intake ports 1 in the present embodiment have a smaller passage resistance than normal helical ports. Thus, in high engine load operating conditions in which a large amount of fuel is required, when uniform charge combustion is carried out, a large amount of intake air can be supplied into the cylinder so that an engine output can be increased. In the present embodiment, to make turbulance in the cylinder at the first stage of the intake stroke strong in uniform charge combustion, as above-mentioned, an open timing of the intake valve may be retarded by using a variable valve timing mechanism.

Figure 19:
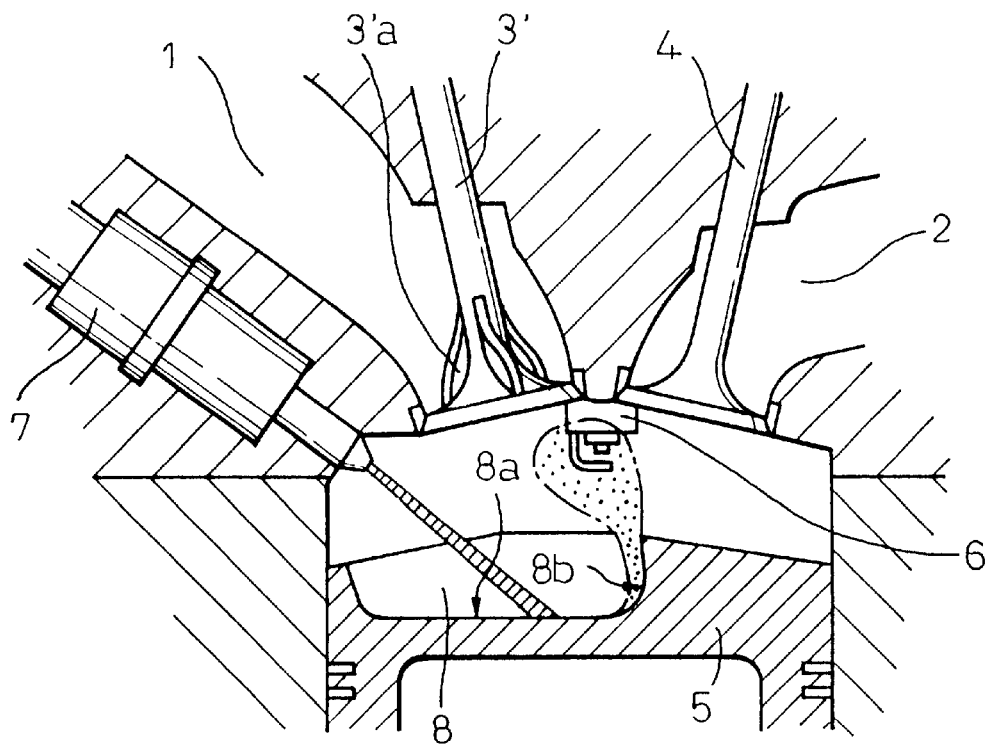
FIG. 19 is a vertical sectional view schematically illustrating a cylinder portion of direct fuel injection-type spark ignition internal combustion engine according to a ninth embodiment of the present invention.
Figure 20:
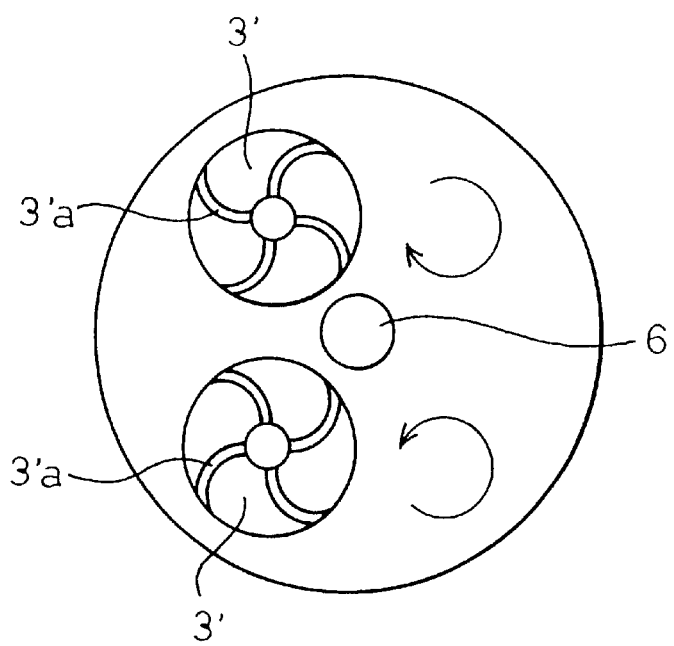
FIG. 20 is a plan view illustrating a top portion of the cylinder according to the ninth embodiment.

FIG. 19 is a vertical sectional view schematically illustrating a cylinder portion of direct fuel injection-type spark ignition internal combustion engine according to a ninth embodiment of the present invention. FIG. 20 is a plan view illustrating a top portion of the cylinder according to the ninth embodiment. In FIGS. 19 and 20, reference numerals identical to those in the first embodiment denote elements identical to those in the first embodiment. In the present embodiment, a plurality of fins 3'a are formed on the back face of the intake valve 3' to give a swirl force nearly about the axis of the intake port 1 to intake air. These fins 3'a have a helical shape about the axis of the intake port 1. Therefore, intake air introduced from the intake port 1 becomes a small swirl turning about the axis of the intake port, and does not become a strong tumbling stream.

This small swirl is different from the tumbling stream vertically turning generally in the cylinder, and easily disappears till the latter half of the compression stroke and does not influence stratified charge combustion. Moreover, this small swirl does not turn along the cylinder bore as the tumbling stream and acts directly the center portion of the cylinder. Therefore, this small swirl can produce a turbulence in the whole cylinder of the same degree as the strong tumbling stream, and thus in uniform charge combustion, the fuel injected at this time can be satisfactorily mixed with air by the turbulence and good uniform charge combustion can be realized. In the present embodiment, in uniform charge combustion, to make turbulance in the cylinder at the first stage of the intake stroke strong in uniform charge combustion, as above-mentioned, an open timing of the intake valve may be retarded by using of a variable valve timing mechanism.

In particular, the fuel injected at the first stage of the intake stroke become easily a rich mixture in the vicinity of the spark plug similar to the fuel injected at the latter half of the compression stroke in stratified charge combustion. However, the small swirl can break up the rich mixture and uniform charge mixture uniformized satisfactorily in the cylinder can be formed at the ignition timing. As the present embodiment, if the center of the small swirl is off-set to the center of the cylinder, the circumference portion of the small swirl, of which the speed is high, can be positioned at the center of the cylinder so that the rich mixture can be broken up more satisfactorily.

Moreover, the small swirl in the present embodiment can easily enter into the cavity in the intake stroke. Therefore, in uniform charge combustion, the fuel injected at the first stage of the intake stroke and stuck to the wall of the cavity 8 can be vaporized by the small swirl and thus the amount of non-burned discharged HC caused by the sticking fuel can be reduced largely.

As the present embodiment, in case that two intake ports 1 adjoining each other are arranged, helical fins 3'a having the same helical direction are formed on each intake valve 3' and each small swirl may have the same turning direction. However, as shown in FIG. 20, the helical directions of the helical fins 3'a formed on the two intake valves 3' are made reverse each other such that each small swirl may turn from the outside to the inside of the cylinder as shown by arrows. Therefore, the circumference portions, of which the speed is high, of the two small swirls are positioned at the center of the cylinder so that the rich mixture in the vicinity of the spark plug can be broken up satisfactorily. The two small swirls are impinged each other so that each small swirl is easily dumped and the combustible mixture in stratified charge combustion can be surely prevented from being broken up. Moreover, the two small swirls enter into the cavity 8 and thus vaporization of the fuel stuck to the wall of the cavity 8 can be improved and an amount of non-burned discharged HC can be reduced.

Figure 21:
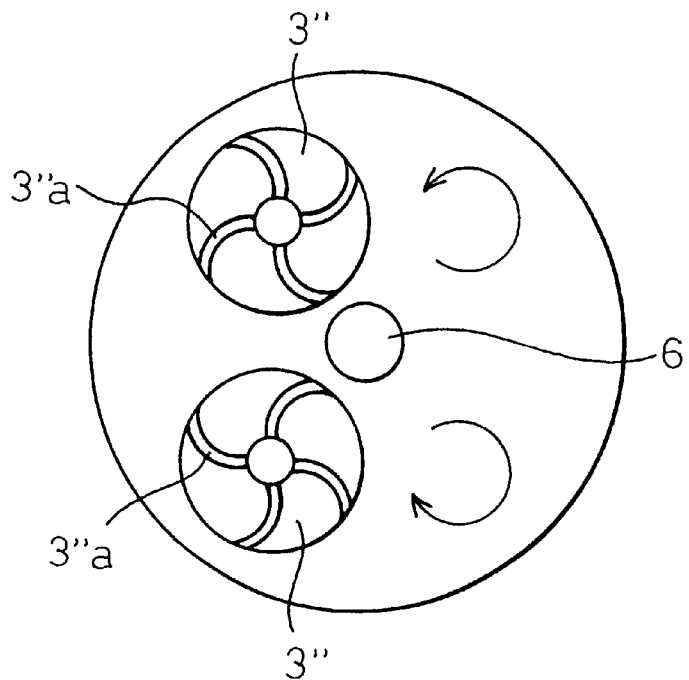
FIG. 21 is a plan view illustrating a top portion of the cylinder according to a modification of the ninth embodiment.

FIG. 21 is a plan view similar to FIG. 20, illustrating a top portion of the cylinder according to a modification of the ninth embodiment. As shown in FIG. 21, the helical directions of the helical fins 3"a formed on the two intake valves 3" are made reverse each other such that each small swirl may turn from the inside to the outside of the cylinder as shown by arrows. Therefore, the circumference portions of which speed is high of the two small swirls are positioned at the center of the cylinder so that the rich mixture in the vicinity of the spark plug can be broken up satisfactorily. The two small swirls enter into the cavity 8 and thus vaporization of the fuel struck to the wall of the cavity 8 can be improved and an amount of non-burned discharged HC can be reduced. Moreover, the two small swirls are impinged to the cylinder bore that each small swirl is easily dumped and the combustible mixture in stratified charge combustion can be surely prevented to be broken up.

Figure 22:
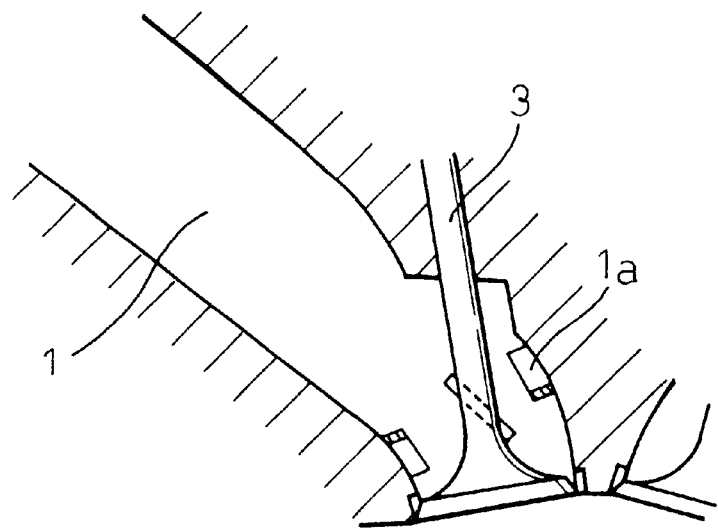
FIG. 22 is a vertical sectional view of the intake port in case that fins for forming the swirl are arranged in the intake port.

To form a small swirl about the axis of the intake port, as shown in FIG. 22, a plurality of fins la may be formed on the circumference of opening of the intake port 1 instead of the fins on the back face of the intake valve 3.

In the above-mentioned first, second, third, and fourth embodiments, in uniform charge combustion, the original strong tumbling stream is produced in the cylinder, and in stratified charge combustion, the original weak tumbling stream is produced in the cylinder. However, the present invention does not intend to always produce the original weak tumbling stream in stratified charge combustion.

As in all of the embodiments, in case that the fuel injector 7 is arranged on the intake port side in the cylinder and the cavity 8 formed on the upper surface of the piston 5 is off-set to the intake port side, the original tumbling stream in the compression stroke hardly enters into the cavity 8 and travels along the upper surface of the piston. Therefore, in stratified charge combustion, if the original weak tumbling stream is formed in the latter half of the compression stroke, the original tumbling stream functions the fuel injected into the cavity to remain in the cavity 8.

In normal stratified charge combustion, at the ignition timing, by forming combustible mixture in the vicinity of the spark plug which positions in the outside of the cavity 8, good stratified charge combustion can be realized to utilize a large amount of air. At this time, if a turbulence in the cylinder is produced by the tumbling stream, combustible mixture is broken up. On the other hand, when stratified charge combustion is carried out in high engine speed operating conditions, the speed of the piston 5 moving up becomes higher than the speed of the vaporized combustible mixture moving up to the spark plug 7 in the cavity 8, and thus the combustible mixture cannot come out from the cavity 8. Thus, at the ignition timing, the spark plug 6 enters into the cavity 8. In such stratified charge combustion, it is preferred that the vaporized fuel is remained in the cavity 8 by the original tumbling stream. In result, combustible mixture becomes easily one body and good stratified combustion can be realized. Accordingly, in the above-mentioned first, second, third, and fourth embodiments, in stratified charge combustion in high engine speed operating conditions, the original tumbling stream of middle strength between those in uniform charge combustion and in stratified charge combustion may be produced in the cylinder.

In the above-mentioned embodiments, to make turbulence strong in the first stage of the intake stroke in uniform charge combustion, an open timing of the intake valve is retarded by using of a variable valve timing mechanism. Also in stratified charge combustion in high engine speed operating conditions, an open timing of the intake valve is retarded so that the original tumbling stream of middle strength may be formed in the cylinder.

In the above-mentioned direct fuel injection-type spark ignition internal combustion engine, the cavity on the upper surface of the piston has the bottom wall to which fuel impinges and the side wall by which fuel traveling on the bottom wall is directed in the vicinity of the spark plug. The bottom wall and the side wall can be distinguished in shape. However, this does not limit to the present invention. For example, in the case that the cavity has a hemispherical shape, if the bottom wall and the side wall cannot be distinguished in shape, the present invention clearly intends a portion of the cavity to which fuel impinges as the bottom wall and a portion of the cavity by which fuel traveling on the bottom wall is directed in the vicinity of the spark plug as the side wall.

The cavity on the upper surface of the piston does not limit to the present invention. For example, in a direct fuel injection-type spark ignition internal combustion engine without a cavity on the upper surface of the piston in which the injected fuel forms directly a combustible mixture in the vicinity of the spark plug, the present invention can be utilized.

Although the invention has been described with reference to specific embodiments thereof, it should be apparent that numerous modifications can be made thereto by those skilled in the art, without departing from the basic concept and scope of the invention.

What is claimed is:

1. A direct fuel injection, spark ignition internal combustion engine comprising a spark plug and a fuel injector for injecting fuel directly into a cylinder, wherein said engine can carry out stratified charge combustion by the fuel injection in the compression stroke and uniform charge combustion by the fuel injection in the intake stroke, said engine comprising variable tumbling stream strength means for substantially equally controlling an amount of air entering the cylinder from each intake port which can make a tumbling stream formed in the cylinder in the intake stroke in said stratified charge combustion weaker than that in said uniform charge combustion.

2. A direct fuel injection, spark ignition internal combustion engine according to claim 1, wherein said variable tumbling stream strength means has an intake air control valve in the intake port, and an open degree of said intake air control valve in said stratified charge combustion is made smaller than that in said uniform charge combustion.

3. A direct fuel injection, spark ignition internal combustion engine according to claim 1; wherein a cavity is formed on an upper surface of a pistion, said cavity has a bottom wall and side wall facing to said fuel injector, in said stratified charge combustion, the fuel injected by said fuel injector travels on said bottom wall of said cavity and is directed in the vicinity of said spark plug by said side wall of said cavity.

4. A direct fuel injection, spark ignition internal combustion engine according to claim 1, wherein said fuel injector injects fuel in nearly a fan shape having a small thickness.

5. A direct fuel injection, spark ignition internal combustion engine comprising a spark plug and a fuel injector for injecting fuel directly into a cylinder, wherein said engine can carry out stratified charge combustion by the fuel injection in a compression stroke and uniform charge combustion by the fuel injection in the intake stroke, said engine comprising variable tumbling stream strength means which can make a tumbling stream formed in the cylinder in the intake stroke in said stratified charge combustion weaker than that in said uniform charge combustion, wherein said variable tumbling stream strength means has a variable intake valve lifting mechanism, a lifting amount of the intake valve in said stratified charge combustion is made smaller than that in said uniform charge combustion by said variable intake valve lifting mechanism.

6. A direct fuel injection, spark ignition internal combustion engine comprising a spark plug and a fuel injector for injecting fuel directly into a cylinder, wherein said engine can carry out stratified charge combustion by the fuel injection in a compression stroke and uniform charge combustion by the fuel injection in the intake stroke, said engine comprising variable tumbling stream strength means which can make a tumbling stream formed in the cylinder in the intake stroke in said stratified charge combustion weaker than that in said uniform charge combustion, wherein said variable tumbling stream strength means has a movable deflection plate arranged in an intake port close to the opening of the intake port to deflect intake air passing through the intake port toward the adjacent side to the exhaust port, and a deflection degree of the intake air in said stratified charge combustion is made smaller than that in said uniform charge combustion by said movable deflection plate.

7. A direct fuel injection, spark ignition internal combustion engine comprising a spark plug and a fuel injector for injecting fuel directly into a cylinder, wherein said engine can carry out stratified charge combustion by the fuel injection in a compression stroke and uniform charge combustion by the fuel injection in the intake stroke, said engine comprising variable tumbling stream strength means which can make a tumbling stream formed in the cylinder in the intake stroke in said stratified charge combustion weaker than that in said uniform charge combustion, wherein said variable tumbling stream strength means has a variable intake air pressure mechanism, and an intake air pressure in at least a latter half of an intake valve lifting in said stratified charge combustion is made lower than that in said uniform charge combustion by said variable intake air pressure mechanism.

8. A direct fuel injection, spark ignition internal combustion engine according to claim 5, wherein an intake air pressure in at least a first half of the intake valve lifting in said stratified charge combustion is made higher than that in said uniform charge combustion by said variable intake air pressure mechanism.

9. A direct fuel injection, spark ignition internal combustion engine comprising a spark plug and a fuel injector for injecting fuel directly into a cylinder, wherein said engine can carry out stratified charge combustion by the fuel injection in a compression stroke and unifrom charge combustion by the fuel injection in an intake stroke, fuel is injected in a first stage of the intake stroke in said uniform charge combustion, said engine comprising flow producing means which can produce a strong flow in the cylinder only in said first stage of the intake stroke.

10. A direct fuel injection, spark ignition internal combustion engine according to claim 9, wherein said flow producing means has a mask wall partly formed about the opening of the intake port, and intake air is introduced from a portion of an opening of an intake port which said mask wall is not formed into the cylinder in said first stage of the intake stroke.

11. A direct fuel injection, spark ignition internal combustion engine according to claim 10, wherein said mask wall is formed about the opening of the intake port at an adjacent side to an exhaust port.

12. A direct fuel injection, spark ignition internal combustion engine according to claim 10, wherein said mask wall is formed about the opening of the intake port at an opposite side to the exhaust port.

13. A direct fuel injection, spark ignition internal combustion engine according to claim 10, wherein said engine has an off-set crank mechanism by which a range of crank angles for a piston moving down is set smaller than that for the piston moving up.

14. A direct fuel injection, spark ignition internal combustion engine according to claim 9, wherein said flow producing means is two intake ports adjoining each other which are helical ports to give swirl forces in reverse directions of each other to intake air.

15. A direct fuel injection, spark ignition internal combustion engine according to claim 14, wherein each of said two intake ports has a portion to give the swirl force to intake air immediately upstream of an intake valve, and no partition wall is formed between said two intake ports except said portions of said two intake ports.

16. A direct fuel injection, spark ignition internal combustion engine according to claim 9, wherein said flow producing means is at least one fin formed on a back face of the intake valve to give a swirl force about an axis of the intake port to intake air introduced from the intake port into the cylinder.

17. A direct fuel injection, spark ignition internal combustion engine according to claim 16, wherein said engine has at least two intake ports adjoining each other.

18. A direct fuel injection, spark ignition internal combustion engine according to claim 9, wherein said flow producing means is at least one fin formed on an inner wall of the intake port to give a swirl force about an axis of the intake port to intake air introduced from the intake port into the cylinder.

19. A direct fuel injection, spark ignition internal combustion engine according to claim 9, wherein said flow producing means has a variable intake valve open timing mechanism, an open timing of the intake valve in said uniform charge combustion is made later than that in said stratified charge combustion by said variable intake valve open timing.

20. A direct fuel injection, spark ignition internal combustion engine comprising a plurality of spark plugs and fuel injectors for injecting fuel directly into each of a plurality of cylinders, wherein said engine can carry out stratified charge combustion by the fuel injection in the compression stroke and uniform charge combustion by the fuel injection in the intake stroke corresponding to each cylinder, said engine comprising variable tumbling stream strength means for substantially equally controlling an amount of air entering each cylinder from each of a plurality of intake ports corresponding to each cylinder, which can make a tumbling stream formed in each cylinder in the intake stroke in said stratified charge combustion weaker than that in said uniform charge combustion.

* * * * *